(12) United States Patent
Bush (10) Patent No.: US 11,075,958 B2
(45) Date of Patent: Jul. 27, 2021

(54) COMMUNICATION SYSTEM AND METHOD FOR APPLYING SECURITY FOR A TIME SENSITIVE NETWORK

(71) Applicant: General Electric Company, Schenectady, NY (US)

(72) Inventor: Stephen Francis Bush, Latham, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 34 days.

(21) Appl. No.: 16/569,409

(22) Filed: Sep. 12, 2019

(65) Prior Publication Data

US 2021/0084078 A1  Mar. 18, 2021

(51) Int. Cl.
*H04L 29/06* (2006.01)
*H04L 29/08* (2006.01)
*H04L 12/24* (2006.01)

(52) U.S. Cl.
CPC ............ *H04L 63/205* (2013.01); *H04L 41/12* (2013.01); *H04L 67/12* (2013.01)

(58) Field of Classification Search
CPC ........ H04L 63/205; H04L 41/12; H04L 67/12
USPC ............................................................ 726/1
See application file for complete search history.

(56) References Cited

U.S. PATENT DOCUMENTS

| 7,200,768 | B2 | 4/2007 | Andersson et al. |
| 7,337,153 | B2 * | 2/2008 | Peljto ................ H02J 3/008 705/412 |
| 8,781,129 | B2 | 7/2014 | Bush et al. |
| 9,099,858 | B2 | 8/2015 | Bush et al. |
| 9,912,585 | B2 | 3/2018 | Korhonen et al. |
| 10,205,784 | B2 | 2/2019 | Bush et al. |
| 10,218,628 | B2 | 2/2019 | Bush |
| 10,298,503 | B2 | 5/2019 | Bush et al. |
| 2004/0186671 | A1* | 9/2004 | Golder ............... G01R 19/2513 702/60 |
| 2009/0106848 | A1 | 4/2009 | Coley |
| 2009/0201899 | A1* | 8/2009 | Liu ........................ H04W 40/02 370/338 |
| 2009/0252046 | A1* | 10/2009 | Canright ................. H04L 41/22 370/250 |
| 2010/0142448 | A1* | 6/2010 | Schlicht .................. H04W 4/20 370/328 |

(Continued)

FOREIGN PATENT DOCUMENTS

EP  3488570 A1  5/2019

OTHER PUBLICATIONS

Joung J. Regulating scheduler (RSC): a novel solution for IEEE 802.1 time sensitive network (TSN). Electronics. Feb. 2019;8(2):189. (Year: 2019).*

(Continued)

*Primary Examiner* — Syed A Zaidi
(74) *Attorney, Agent, or Firm* — Joseph F. Harding; The Small Patent Law Group LLC (57) ABSTRACT

A method includes identifying power connections between plural components of a time sensitive network (TSN) that are interconnected via a predetermined connection plan. The method also includes determining a topology of the components of the TSN based on the power connections. Also, the method includes scheduling flows for the TSN based on the topology determined based on the power connections.

17 Claims, 3 Drawing Sheets

(56) References Cited

U.S. PATENT DOCUMENTS

| | | | |
|---|---|---|---|
| 2012/0029897 A1* | 2/2012 | Cherian | H02J 13/00001 703/18 |
| 2012/0143383 A1* | 6/2012 | Cooperrider | H05B 47/105 700/295 |
| 2012/0193984 A1* | 8/2012 | Krok | H02J 13/0079 307/31 |
| 2012/0266209 A1* | 10/2012 | Gooding | H04L 63/20 726/1 |
| 2012/0323381 A1* | 12/2012 | Yadav | H04L 63/1441 700/286 |
| 2013/0111566 A1* | 5/2013 | Carley | H04M 3/303 726/4 |
| 2014/0012524 A1* | 1/2014 | Flammer, III | H02J 13/0075 702/60 |
| 2014/0298399 A1* | 10/2014 | Heo | H04L 63/1416 726/1 |
| 2015/0135260 A1* | 5/2015 | Ilyadis | H04L 41/042 726/1 |
| 2017/0272366 A1* | 9/2017 | Bush | H04L 45/302 |
| 2018/0006956 A1 | 1/2018 | Bush et al. | |
| 2018/0090988 A1 | 3/2018 | MacCleery et al. | |
| 2018/0132234 A1 | 5/2018 | Cavalcanti et al. | |
| 2019/0123847 A1 | 4/2019 | Bush et al. | |
| 2019/0173743 A1* | 6/2019 | Gerszberg | H04L 41/12 |

OTHER PUBLICATIONS

NPL Search Terms (Year: 2020).*

NPL Search Terms (Year: 2021).*

Junjia Qi et al, .; "Cybersecurity for distributed energy resources and smart inverters", IET Cyber-Physical Systems: Theory & Applications, IET Cyber-Phys. Syst., Theory Appl., 2016, vol. 1, Iss. 1, pp. 28-39, 12 pages.

Zhou et al., "Analysis and modeling of asynchronous traffic shaping in time sensitive networks", Jun. 13-15, 2018, Conference Location: Imperia, Italy.

* cited by examiner

COMMUNICATION SYSTEM AND METHOD FOR APPLYING SECURITY FOR A TIME SENSITIVE NETWORK

GOVERNMENT LICENSE RIGHTS

This invention was made with government support under contract number DE-OE0000894 awarded by the Department of Energy. The government has certain tights in the invention.

FIELD

Embodiments of the present disclosure generally relate to systems and methods for communicating data in networks.

BACKGROUND

Various types of control systems communicate data between or among different components in order to enable control operations of powered systems. For example, locomotives, automobiles, surgical suites, power plants, etc., include many systems that communicate with each other in order to control operations of the locomotives, automobiles, surgical suites, and power plants.

The operations of these powered systems may rely on on-time and accurate delivery of data frames among various devices. Failure to deliver some data at or within designated times may result in failure or reduced effectiveness of the powered system. Without timely information, feedback control systems cannot maintain performance and stability.

Aspects of control systems (e.g., components or groups of components that form part of a network such as a power grid) may be subject to external security risks. Various cybersecurity measures may be implemented over such a network; however, such measures may require a large amount of processing resources and/or not provide a desired level of security.

BRIEF DESCRIPTION

In one embodiment, a method includes identifying power connections between plural components of a time sensitive network (TSN) that are interconnected via a predetermined connection plan. The method also includes determining a topology of the components of the TSN based on the power connections. Also, the method includes scheduling flows for the TSN based on the topology determined based on the power connections.

In one embodiment, a scheduler is configured for use with a time sensitive network (TSN). The scheduler including one or more processors configured to identify power connections between plural components of the TSN that are interconnected via a predetermined connection plan; determine a topology of the components of the TSN based on the power connections; and schedule flows for the TSN based on the topology determined based on the power connections.

In one embodiment, a system includes a time sensitive network (TSN), a scheduler, and a communication network. The TSN includes plural components that are interconnected via a predetermined connection plan. The scheduler is configured for use with the TSN, and includes one or more processors configured to identify power connections between the plural components of the TSN that are interconnected via the predetermined connection plan; determine a topology of the components of the TSN based on the power connections; and schedule flows for the TSN based on the topology determined based on the power connections. The communication network couples the scheduler and TSN.

BRIEF DESCRIPTION OF THE DRAWINGS

The subject matter described herein will be better understood from reading the following description of non-limiting embodiments, with reference to the attached drawings, wherein below.

DETAILED DESCRIPTION

Certain embodiments of the present disclosure provide systems and methods that efficiently schedule flows for components of a time sensitive network (TSN), such as, for example, a power grid. Various embodiments couple data flow and deterministic delivery with power control to schedule flows in a TSN more efficiently than if power and data transmission were considered separately. Various embodiments provide improved application of cybersecurity to TSN flows. For example, various embodiments apply cybersecurity to TSN flows based upon the impact upon the power grid. For example, flows that control or impact large magnitudes of power have a more significant impact on grid stability and may be assigned greater cybersecurity (e.g., a more robust security measure such as quantum key distribution (QKD)). In contrast to certain conventional approaches that apply cybersecurity equally to all power grid components, various embodiments provide for more efficient allocation of cybersecurity resources. Various embodiments provide a mathematical mapping between power flow and data flow in a power grid and use the mapping in connection with a TSN scheduler for the power grid.

Figure 1:
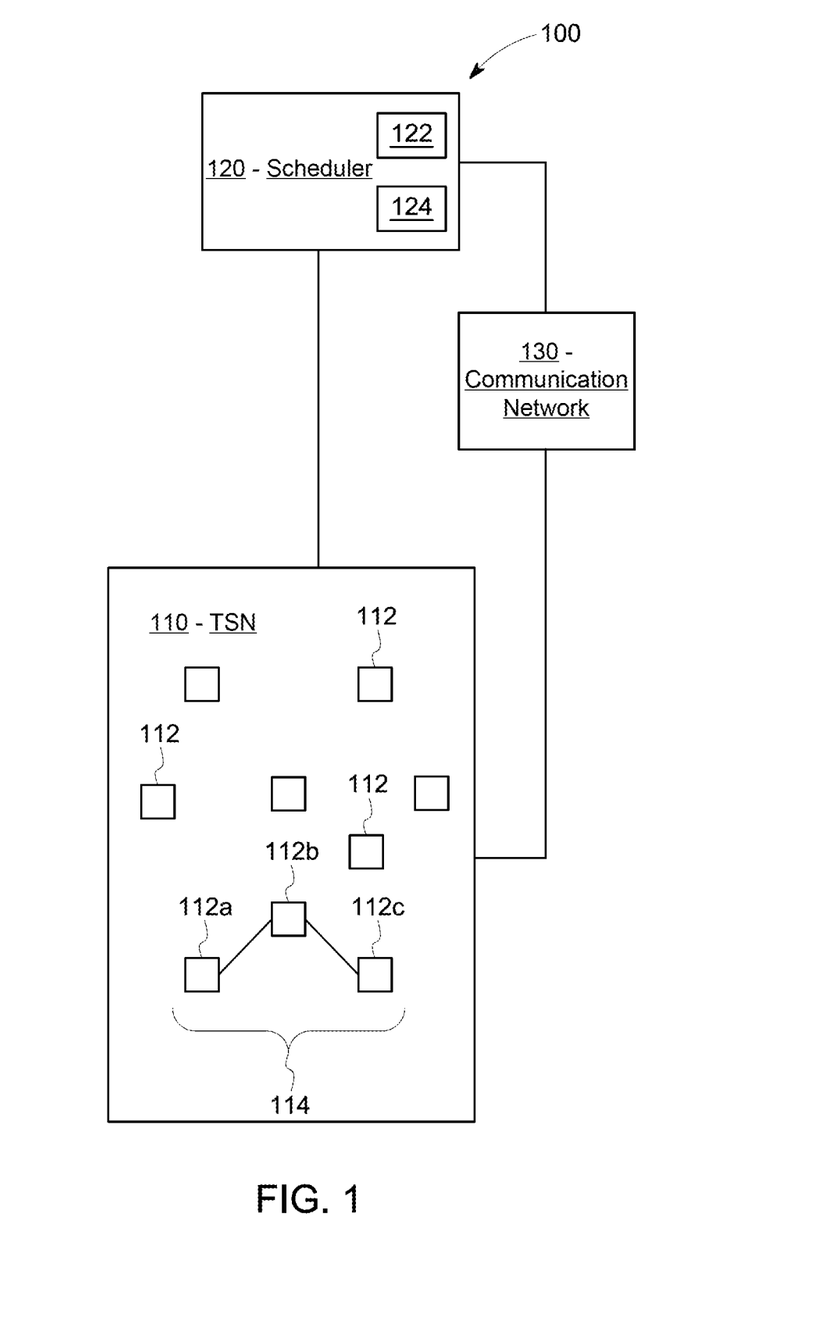
FIG. 1 provides a block diagram of an example system according to one or more embodiments of subject matter described herein.

FIG. 1 provides a block diagram of an example system 100 that includes a time sensitive network (TSN) 110, a scheduler 120, and a communication network 130. Generally, the scheduler 120 is configured to schedule flows (communication flows) for the TSN 110, and the communication network 130 couples the scheduler 120 and TSN 110.

The TSN 110 includes plural components 112 that are interconnected via a predetermined power connection plan. Generally, the TSN 110 is configured and/or operated so that commands or other communications are provided to the various components 112 in a highly synchronized manner (e.g., with nanosecond precision). In various embodiments, the communications may include priority communications and best effort communications, with the priority communications given a higher priority than the best effort communications, and the best effort communications performed when possible without interrupting or impeding the best effort communications. The TSN 110 may be configured for example, as a power grid. As another example, the TSN 110 may be an engine control system for a vehicle.

Generally, in various embodiments, the TSN 110 may be at least partially defined by a set of standards developed by the Time-Sensitive Networking Task Group, and includes one or more of the IEEE 802.1 standards. While an Ethernet network may operate without TSN, such a network may communicate data frames or packets in a random or pseudo-random manner that does not ensure that the data is communicated within designated time periods or at designated times. A TSN-based Ethernet network, however, can dictate when certain data communications occur to ensure that certain data frames or packets are communicated within designated time periods or at designated times. Data transmissions within a TSN-based Ethernet network can be based on a global time or time scale of the network that is the same for the devices in or connected with the network, with the times or time slots in which the devices communicate being scheduled for at least some of the devices.

The TSN 110 can be an Ethernet based network that communicates different categories or groups or types of data according to different priorities. For example, the TSN 110 can communicate time sensitive data according to the schedule or schedules determined by the scheduler 120. The time sensitive data is communicated at designated times or within designated time periods, while best effort traffic and/or rate constrained traffic is attempted to be communicated in a timely manner, but that may be delayed in order to ensure that the time sensitive data is communicated to achieve or maintain a desired quality of service.

In the illustrated example, the depicted TSN 110 is a power grid, and includes components 112. The components 112 are interconnected to each other via a predetermined power connection plan that defines which components 112 are connected to each other to provide power or perform another task of the power grid. The various components 112 may be connected to each other via a hardwired Ethernet connection.

The various aspects of the system 100 interact with each other to generate a schedule for the TSN 110. For example, the components 112 may include intelligent electronic devices that communicate their communication interface and connectivity information to the scheduler 120 via the communication network 130, where the connectivity information includes both power connectivity and network connectivity. Also, power grid goals (e.g., remedial action plans) may be communicated to the scheduler 120 from the TSN 110. Further, network connectivity information may be communicated to the scheduler 120 (e.g., via the communication network 130). Then, the scheduler 120 computes TSN flow schedules that enforce security constraints to protect TSN flows that impact power stability. The scheduler 120 may achieve security goals, for example, by selecting appropriate paths or routes for interconnected or associated components to provide less vulnerable paths for higher priority components, and/or by assigning more robust security techniques for higher priority components.

In practice, a large number of components 112 may be present in the TSN 110, with different groups of the components 112 connected with each other. Only one example of a connection is shown in FIG. 1 for clarity of illustration, but it may be noted that many connections may be included in the TSN 110.

In the illustrated example, a path 114 includes a relay controller 112a, a power relay 112b, and an egress gate 112c. The relay controller 112a is used to control the power relay 112b. For example, the relay controller 112a may be used to control the power relay 112b to provide power at a given location and/or perform a responsive action. The egress gate 112c controls whether the path 114 is actively communicating or not. The egress gate 112c is generally closed, but may be opened to provide communication along, to, or from the path 114. Generally, only one egress gate in the TSN 110 is open at a given time to avoid confusion of communication from one path with any other path.

The scheduler 120 in the illustrated example determines or schedules communication flows between various components 112 along paths or routes. Generally, the scheduler 120 determines which components 112 need to communicate with each other and schedules appropriate communication flows between components 112 to provide the required communication. The scheduler 120, for example, may include a tool that is programmed or configured to look at a power grid network and identify relays and other components that need to communicate with each other. The scheduler 120 then schedules which components 112 communicate with each other along with the route or path as well as the timing of communications among each connected group of components 112. Various paths or routes may be prioritized (e.g., priority paths given higher priority over best efforts paths. After the various connections between the components 112 are identified, message types and required times for the messages may be populated into a schedule prepared by the scheduler 120. In some embodiments the scheduler 120 is coupled to the TSN 110 before a time of implementation of the TSN 110, and may not be coupled to the TSN 110 during operation of the TSN 110. Alternatively or additionally, the scheduler 120 may be coupled to the TSN 110 continuously or intermittently during operation of the TSN 110 and may be used to dynamically update the schedule and/or periodically update the schedule.

In the illustrated embodiment the scheduler 120 includes a processor 122 and a memory 124. It may be noted that only one processor 122 and one memory 124 are shown for ease of depiction in FIG. 1. However, the block 122 may represent more than one processor and the block 124 may represent more than one memory. Generally, the scheduler 120 shown in FIG. 1 represents hardware circuitry that includes and/or is connected with one or more processors (e.g., microprocessors, integrated circuits, field programmable gate arrays, etc.) that perform operations to schedule flows for the TSN 110 as discussed herein. The memory 124 may include one or more computer readable storage media. The memory 124, for example, may store information regarding network and/or component properties. Further, the process flows and/or flowcharts discussed herein (or aspects thereof) may represent one or more sets of instructions that are stored in the memory 124 for direction of operations of the scheduler 120.

Accordingly, in various embodiments the scheduler 120 includes processing circuitry configured to perform one or more tasks, functions, or steps discussed herein. It may be noted that the term "processing unit" or "processor" as used herein is not intended to necessarily be limited to a single processor or computer. For example, the scheduler 120 may include multiple processors, ASIC's, FPGA's, and/or computers, which may be integrated in a common housing or unit, or which may distributed among various units or housings. It may be noted that operations performed by the scheduler 120 (e.g., operations corresponding to process flows or methods discussed herein, or aspects thereof) may be sufficiently complex that the operations may not be performed by a human being within a reasonable time period. For example, the identification of components and connections for an entire TSN, the determination of a corresponding topology, and the scheduling of flows for the entire TSN as discussed herein may rely on or utilize computations that may not be completed by a person within a reasonable time period.

The depicted scheduler 120 includes the processor 122 which is configured (e.g., programmed or directed by instructions stored in memory 124) to identify power connections between the plural components 112 of the TSN 110 that are interconnected via the predetermined connection plan. Then, the scheduler 120 (e.g., the processor 122 of the scheduler 120) determines a topology of the components 112 of the TSN 110 based on the power connections. Next, the processor 122 schedules flows for the TSN 110 based on the topology determined based on the power connections. Additional details and examples regarding scheduling (e.g., one or more scheduling tasks that may be carried out by the scheduler 120) are discussed in connection with FIG. 2.

Figure 2:
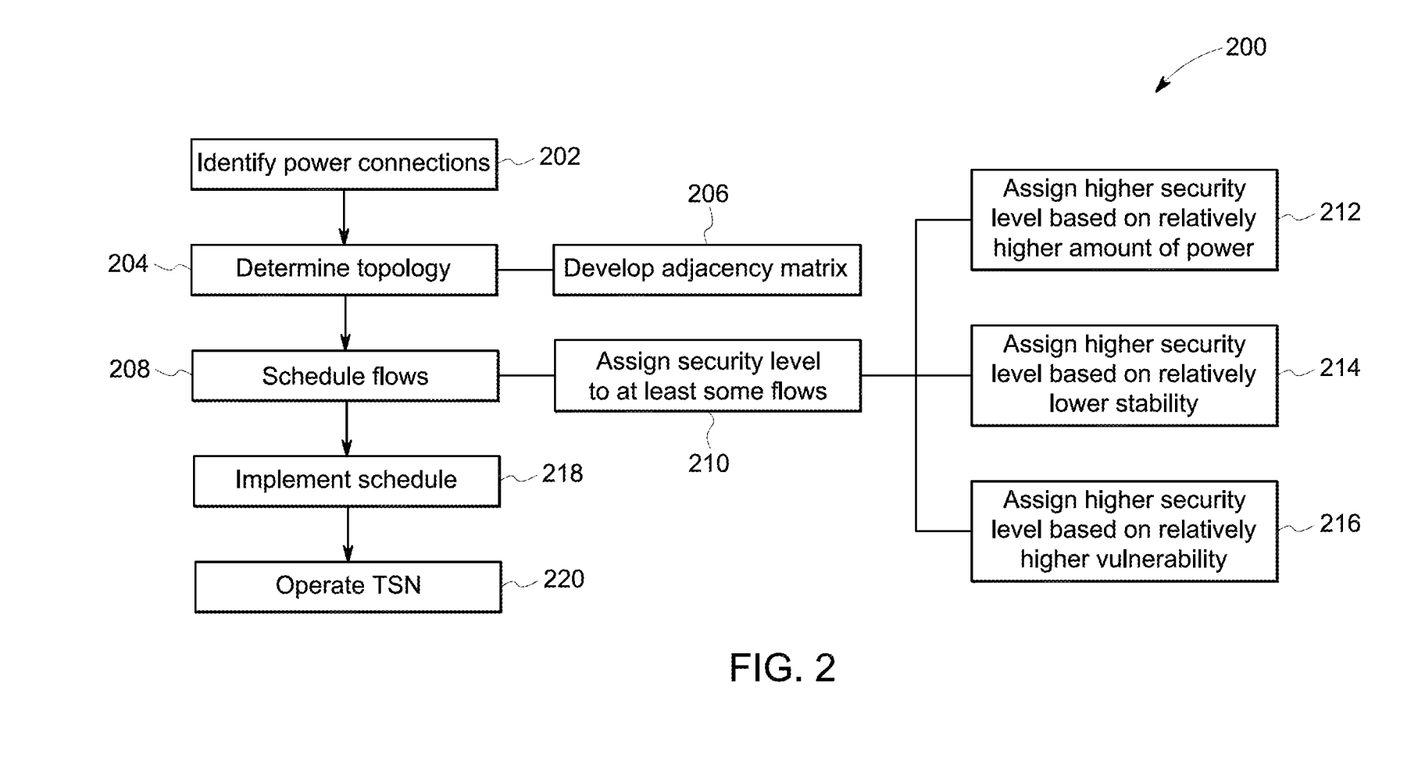
FIG. 2 illustrates a flowchart of one embodiment of a method in accordance with one or more embodiments of subject matter described herein.

FIG. 2 provides a flowchart of a method 200 in accordance with various embodiments. The method 200, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 200 may be able to be used as one or more algorithms to direct hardware (e.g., one or more aspects of the scheduler 120) to perform one or more operations described herein.

At 202, power connections are identified between plural components (e.g., components 112) of a TSN (e.g., TSN 110). The connections may be identified autonomously by a scheduler or processing device (e.g., scheduler 120). The plural components are interconnected by a predetermined connection plan that specifies the power connections between the components. The predetermined plan may be set forth under a guide or standard.

At 204, a topology of the components of the TSN is determined. The topology is determined based on the power connections identified at 202. For example, information regarding the power connections may be autonomously acquired from the TSN (or from individual components of the TSN) by a scheduler or processing device, and the power connections identified from the information. Then, a topology of the components may be determined, with the topology linking or associating components together that function together to provide power or perform related tasks. Determining the topology in various embodiments includes generating one or more models (e.g., mathematical models) that depict or describe a relationship among components of the TSN based on power connections between the components.

Figure 3:
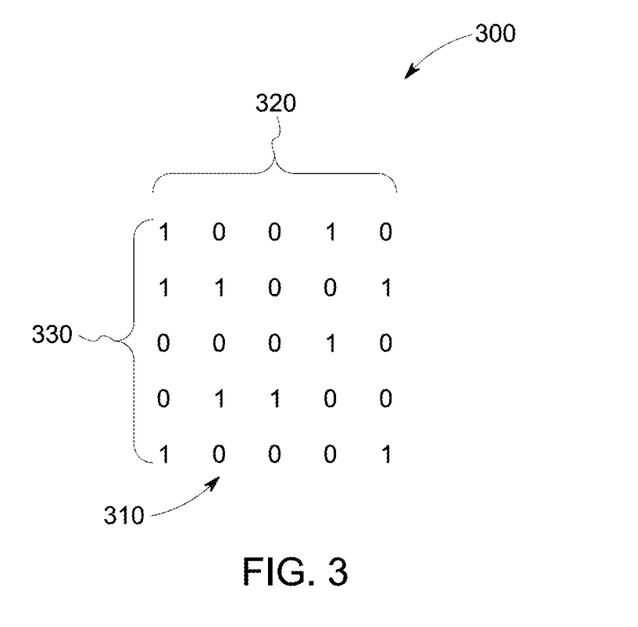
FIG. 3 illustrates an example adjacency matrix in accordance with one or more embodiments of subject matter described herein.

For instance, in the depicted example, at 206, an adjacency matrix is developed. The adjacency matrix describes connections between different components of the TSN. For example, each component may correspond to a node of the adjacency matrix, with connections between the nodes referred to as edges or links, and the nodes arranged in columns and rows. FIG. 3 provides an illustration of an example adjacency matrix 300 that includes nodes 310 arranged in columns 320 and rows 330, with the intersection between a given column and a given row referred to as a cell. For nodes that are connected, a cell of the matrix corresponding to the intersection of both nodes is indicated with a "1." For nodes that are not connected, the cell of the matrix corresponding to the intersection of both nodes is indicated with a "0."

Figure 4:
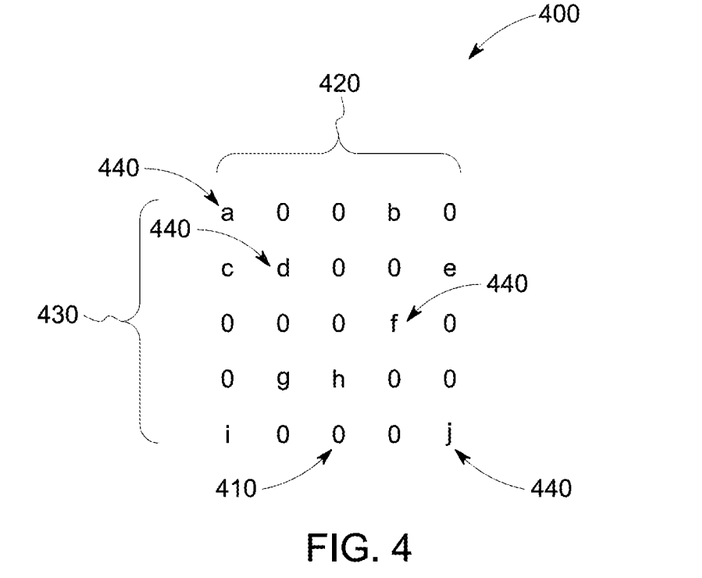
FIG. 4 illustrates another example adjacency matrix in accordance with one or more embodiments of subject matter described herein.

It may be noted that, in some embodiments, instead of just representing the presence or absence of a connection, the adjacency matrix may alternatively or additionally show a degree of connection and/or a characteristic of the connection. For example, FIG. 4 provides an illustration of an example adjacency matrix 400 that includes nodes 310 arranged in columns 420 and rows 430. However, instead of just 1's or 0's, the adjacency matrix 400 includes weighted indicators 440. The weighted indicators 440 are represented as letters in the depicted example. For example, cells corresponding to intersections of nodes that are not connected with each other receive a "0" while cells corresponding to intersections of connected nodes receive a weighted indicator 410. In the illustrated embodiment, the weighted indicators correspond to a delay (e.g., delay time for communications between the corresponding components) in the corresponding connection between two components of the TSN (i.e., a given weighted indicator describes the delay (e.g., in nanoseconds) between the two components corresponding to the cell of the adjacency matrix in which the given weighted indicator resides).

With continued reference to FIG. 2, at 208, flows for the TSN are scheduled (e.g., by scheduler 120). The flows are scheduled based on the topology determined based on the power connections at 204. The flows in various embodiments correspond to routes or paths through Ethernet hardware over various nodes of the system. The schedule may specify, for a given flow, the components that are part of the flow, the route or path for communications among the components, and the timing for communications along the flow. For example, when scheduling flows for a power grid, a power relay may be identified, and a best available relay controller selected based on predetermined criteria. The relay and relay controller may then be associated with each other and other components (including an egress gate) as part of a scheduled flow. Each route or path may terminate in an egress gate that is normally closed. Generally, only one gate is open at a time to avoid overlap or interference of different communications. The flows may also be prioritized, for example, with some flows identified as best-efforts flows that receive a lower priority as discussed herein. In contrast to conventional approaches that use a slice-by-slice approach or consider flows individually or serially, the determining of the topology and the scheduling of flows in various embodiments may be performed (e.g., by the scheduler 120) taking into account the entire TSN (or grouped portions thereof) together. For example, more secure or less vulnerable routes or paths may be identified and assigned to components for which greater security is desirable.

In addition to specifying components and paths or routes, the scheduled flow may also specify a security level that is utilized in connection with one or more flows. For example, in the illustrated embodiment, at 210, a security level is assigned to at least some of the flows. The security level may be assigned based on the corresponding power connections in various embodiments. Generally, based on the components included in or affected by the flow, a level of security is assigned to the flow. For example, flows determined to merit a higher level of security may be assigned a more robust security technique (or level of protection) such as use of quantum key distribution (QKD). Flows determined to merit lower level of security may be assigned security techniques (or levels of protection) that require less processing resources. Accordingly, security processing resources may be efficiently allocated over the TSN as part of the scheduling process. In various embodiments, one or more criteria may be used to determine assigned security levels. Example criteria include amount of power associated with a flow, stability of a flow, or vulnerability of a flow. It may be noted that flows may be arranged individually or in groups in hierarchically ranked orders with security levels based on the ranking.

For example, in the illustrated embodiment, at 212, a higher security level is assigned to at least one flow based on a relatively higher amount of power associated with the at least one flow. For example, a more robust key or higher security level may be assigned to components of the grid that provide a higher amount of power to provide greater protection to portions of the grid more heavily relied upon for power.

As another example, at 214, a higher security level is assigned to at least one flow based on a relatively lower amount of stability associated with the at least one flow. Accordingly, less stable aspects of the TSN may receive greater security protection.

As one more example, at 216, a higher security level is assigned to at least one flow based on a relatively higher vulnerability associated with the at least one flow. The vulnerability may be determined, for example, using a vulnerability index. Further, the vulnerability may take into account one or more components along the flow, as well as the route or path of the flow itself. It may be noted that security and/or vulnerability of paths may also be taken into account when the flows are scheduled. For example, for components for which a relatively higher amount of security is desirable, routes or paths may be evaluated based on vulnerability, and less vulnerable routes or paths scheduled for components for which higher security is desired. Accordingly, a route or path for a given group of components may be selected and/or modified to reduce vulnerability.

At 218, the schedule is implemented in the TSN, and at 220, the TSN is operated pursuant to the schedule. For example, the schedule is utilized to facilitate communications among the various components to deliver information with high precision and security.

In one embodiment, a method includes identifying power connections between plural components of a time sensitive network (TSN) that are interconnected via a predetermined connection plan. The method also includes determining a topology of the components of the TSN based on the power connections. Also, the method includes scheduling flows for the TSN based on the topology determined based on the power connections.

In one example, the method includes assigning a security level to at least some of the flows based on the corresponding power connections In one example, the method includes assigning a higher security level to at least one flow based on a relatively higher amount of power associated with the at least one flow.

In one example, the method includes assigning a higher security level to at least one flow based on a relatively lower amount of stability associated with the at least one flow.

In one example, the method includes assigning a higher security level to at least one flow based on a relatively higher vulnerability associated with the at least one flow.

In one example, determining the topology includes developing an adjacency matrix describing at least a portion of the topology.

In one example, the one adjacency matrix comprises weighted indicators corresponding to a delay in a corresponding connection between two components of the TSN.

In one embodiment, a scheduler is configured for use with a time sensitive network (TSN). The scheduler including one or more processors configured to identify power connections between plural components of the TSN that are interconnected via a predetermined connection plan; determine a topology of the components of the TSN based on the power connections; and schedule flows for the TSN based on the topology determined based on the power connections.

In one example, the one or more processors are further configured to assign a security level to at least some of the flows based on the corresponding power connections.

In one example, the one or more processors are further configured to assign a higher security level to at least one flow based on a relatively higher amount of power associated with the at least one flow.

In one example, the one or more processors are further configured to assign a higher security level to at least one flow based on a relatively lower amount of stability associated with the at least one flow.

In one example, the one or more processors are further configured to assign a higher security level to at least one flow based on a relatively higher vulnerability associated with the at least one flow.

In one example, the one or more processors are further configured to determine the topology by developing an adjacency matrix describing at least a portion of the topology.

In one example, the adjacency matrix includes weighted indicators corresponding to a delay in a corresponding connection between two components of the TSN.

In one embodiment, a system includes a time sensitive network (TSN), a scheduler, and a communication network. The TSN includes plural components that are interconnected via a predetermined connection plan. The scheduler is configured for use with the TSN, and includes one or more processors configured to identify power connections between the plural components of the TSN that are interconnected via the predetermined connection plan; determine a topology of the components of the TSN based on the power connections; and schedule flows for the TSN based on the topology determined based on the power connections. The communication network couples the scheduler and TSN.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:
1. A method comprising:
  identifying power connections between plural components of a time sensitive network (TSN) that are interconnected via a predetermined connection plan;
  determining a topology of the components of the TSN based on the power connections; and scheduling flows for the TSN based on the topology determined based on the power connections, wherein scheduling the flows comprises assigning a security level to at least some of the flows based on the corresponding power connections.

2. The method of claim 1, further comprising assigning a higher security level to at least one flow based on a relatively higher amount of power associated with the at least one flow.

3. The method of claim 1, further comprising assigning a higher security level to at least one flow based on a relatively lower amount of stability associated with the at least one flow.

4. The method of claim 1, further comprising assigning a higher security level to at least one flow based on a relatively higher vulnerability associated with the at least one flow.

5. The method of claim 1, wherein determining the topology comprises developing an adjacency matrix describing at least a portion of the topology.

6. The method of claim 5, wherein the one adjacency matrix comprises weighted indicators corresponding to a delay in a corresponding connection between two components of the TSN.

7. A scheduler configured for use with a time sensitive network (TSN), the scheduler comprising:
one or more processors configured to:
identify power connections between plural components of the TSN that are interconnected via a predetermined connection plan;
determine a topology of the components of the TSN based on the power connections; and
schedule flows for the TSN based on the topology determined based on the power connections, wherein the one or more processors are further configured to assign a security level to at least some of the flows based on the corresponding power connections.

8. The scheduler of claim 7, wherein the one or more processors are further configured to assign a higher security level to at least one flow based on a relatively higher amount of power associated with the at least one flow.

9. The scheduler of claim 7, wherein the one or more processors are further configured to assign a higher security level to at least one flow based on a relatively lower amount of stability associated with the at least one flow.

10. The scheduler of claim 7, wherein the one or more processors are further configured to assign a higher security level to at least one flow based on a relatively higher vulnerability associated with the at least one flow.

11. The scheduler of claim 7, wherein the one or more processors are further configured to determine the topology by developing an adjacency matrix describing at least a portion of the topology.

12. The scheduler of claim 11, wherein the adjacency matrix comprises weighted indicators corresponding to a delay in a corresponding connection between two components of the TSN.

13. A system comprising:
a time sensitive network (TSN) comprising plural components that are interconnected via a predetermined connection plan;
a scheduler configured for use with the TSN, the scheduler including one or more processors configured to:
identify power connections between the plural components of the TSN that are interconnected via the predetermined connection plan;
determine a topology of the components of the TSN based on the power connections; and
schedule flows for the TSN based on the topology determined based on the power connections, wherein the one or more processors are further configured to assign a security level to at least some of the flows based on the corresponding power connections; and
a communication network coupling the scheduler and TSN.

14. The system of claim 13, wherein the one or more processors are further configured to assign a higher security level to at least one flow based on a relatively higher amount of power associated with the at least one flow.

15. The system of claim 13, wherein the one or more processors are further configured to assign a higher security level to at least one flow based on a relatively lower amount of stability associated with the at least one flow.

16. The system of claim 13, wherein the one or more processors are further configured to assign a higher security level to at least one flow based on a relatively higher vulnerability associated with the at least one flow.

17. The system of claim 13, wherein the one or more processors are further configured to determine the topology by developing an adjacency matrix describing at least a portion of the topology.

* * * * *